(12) United States Patent
Pohlen

(10) Patent No.: US 11,639,085 B2
(45) Date of Patent: May 2, 2023

(54) LUMINESCENT GLAZINGS

(71) Applicant: ACR II GLAS AMERICA INC., Nashville, TN (US)

(72) Inventor: Markus Walter Pohlen, Mückeln (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 183 days.

(21) Appl. No.: 17/038,419

(22) Filed: Sep. 30, 2020

(65) Prior Publication Data

US 2021/0101453 A1    Apr. 8, 2021

Related U.S. Application Data

(60) Provisional application No. 62/909,478, filed on Oct. 2, 2019.

(51) Int. Cl.
| | | |
|---|---|---|
| *B60J 1/00* | (2006.01) | |
| *B32B 17/10* | (2006.01) | |
| *B60K 35/00* | (2006.01) | |
| *C09K 11/06* | (2006.01) | |
| *G02B 27/01* | (2006.01) | |
| *B32B 7/12* | (2006.01) | |
| *B32B 27/30* | (2006.01) | |
| *B32B 23/08* | (2006.01) | |
| *B32B 27/08* | (2006.01) | |
| *B32B 27/22* | (2006.01) | |
| *B32B 27/40* | (2006.01) | |

(Continued)

(52) U.S. Cl.
CPC ......... *B60J 1/001* (2013.01); *B32B 17/10036* (2013.01); *B32B 17/10541* (2013.01); *B32B 17/10669* (2013.01); *B32B 17/10761* (2013.01); *B60K 35/00* (2013.01); *C09K 11/06* (2013.01); *G02B 27/0101* (2013.01); *B32B 2605/006* (2013.01); *B60K 2370/1529* (2019.05); *G02B 2027/012* (2013.01)

(58) Field of Classification Search
None
See application file for complete search history.

(56) References Cited

U.S. PATENT DOCUMENTS 8,339,332 B2   12/2012   Kanou
9,314,998 B2   4/2016   Labrot et al.
(Continued)

FOREIGN PATENT DOCUMENTS

JP   2014-024312 A   2/2014
JP   2016-069215 A   5/2016
(Continued)

OTHER PUBLICATIONS

Extended European search report issued by European Patent Office for European application No. 20199841.6, datead Jan. 28, 2021.

*Primary Examiner* — Ramsey Zacharia
(74) *Attorney, Agent, or Firm* — K&L Gates LLP

(57) ABSTRACT

A disclosed laminated automotive glazing for displaying an image comprises a first glass sheet; a first interlayer; a luminescent film having luminescent capabilities; a second interlayer; and a second glass sheet, wherein the luminescent film is reactive to an activating light wavelength, and wherein the second interlayer is transparent to the activating light wavelength and the first interlayer has a transparency at the activating light wavelength of equal to or less than 1.0%.

18 Claims, 4 Drawing Sheets

(51) Int. Cl.
 _B32B 27/18_ (2006.01)
 _B32B 27/20_ (2006.01)
 _B32B 27/36_ (2006.01)
 _B32B 7/023_ (2019.01)

(56) References Cited

U.S. PATENT DOCUMENTS

| | | |
|---|---|---|
| 2006/0171007 A1 | 8/2006 | Chen et al. |
| 2014/0076397 A1* | 3/2014 | Wagenblast .......... H01L 31/055 428/522 |
| 2015/0352814 A1 | 12/2015 | Keller et al. |
| 2016/0252723 A1 | 9/2016 | Dekoninck et al. |
| 2017/0001417 A1 | 1/2017 | Oota et al. |
| 2017/0287369 A1 | 10/2017 | Oota et al. |
| 2019/0283382 A1* | 9/2019 | Murase .................... C08J 7/048 |
| 2020/0061974 A1 | 2/2020 | Droge et al. |

FOREIGN PATENT DOCUMENTS

| | | |
|---|---|---|
| JP | 2018-168061 A | 11/2018 |
| JP | 2018-177637 A | 11/2018 |

\* cited by examiner

LUMINESCENT GLAZINGS

CROSS REFERENCE TO RELATED APPLICATION

This application claims priority to U. S. Provisional Application No. 62/909,478 filed on Oct. 2, 2019, entitled "LUMINESCENT GLAZINGS," the entire contents of which are incorporated by reference herein in their entirety.

TECHNICAL FIELD

The present disclosure generally relates to a vehicle glazing having a luminescent film, wherein an image may be projected onto the luminescent film.

BACKGROUND

Head-up display (HUD) systems are used in vehicles to provide an image that a driver may see without averting their eyes from the windshield in front of them. HUD systems may typically include a projector which may project an image to be reflected off of a windshield, such that the driver may see a virtual image(s). A windshield, however, has two reflective glass surfaces which may each reflect an image from a projector. The multiple reflections may have varying intensities where a weaker image reflection may appear as a "ghost" image, which may be hazy and less clear than the other image.

Wedge-shaped polymer interlayers have been used to address this problem by aligning the two images such that there is a single image observed by a driver. However, the wedge shape is not adjustable, and the images are aligned only for drivers of a particular height. There is a need in the art for a widely applicable solution for HUD displays. Particularly, there is a need for drivers of any height to be able to see an image and for the ability to use multiple projectors to create a more complex display.

SUMMARY OF THE DISCLOSURE

Disclosed herein is a laminated automotive glazing, comprising: a first glass sheet; a first interlayer; a luminescent film having luminescent capabilities; a second interlayer; and a second glass sheet, wherein the luminescent film is reactive to an activating light wavelength, and wherein the second interlayer is transparent to the activating light wavelength and the first interlayer has a transparency at the activating light wavelength of equal to or less than 1.0%.

In some disclosure, the laminated automotive glazing may have the luminescent film formed with a carrier film. The laminated automotive glazing may also have the luminescent film formed with a luminescent core layer positioned between barrier layers for preventing plasticizers in the interlayers from migrating during an autoclave step.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
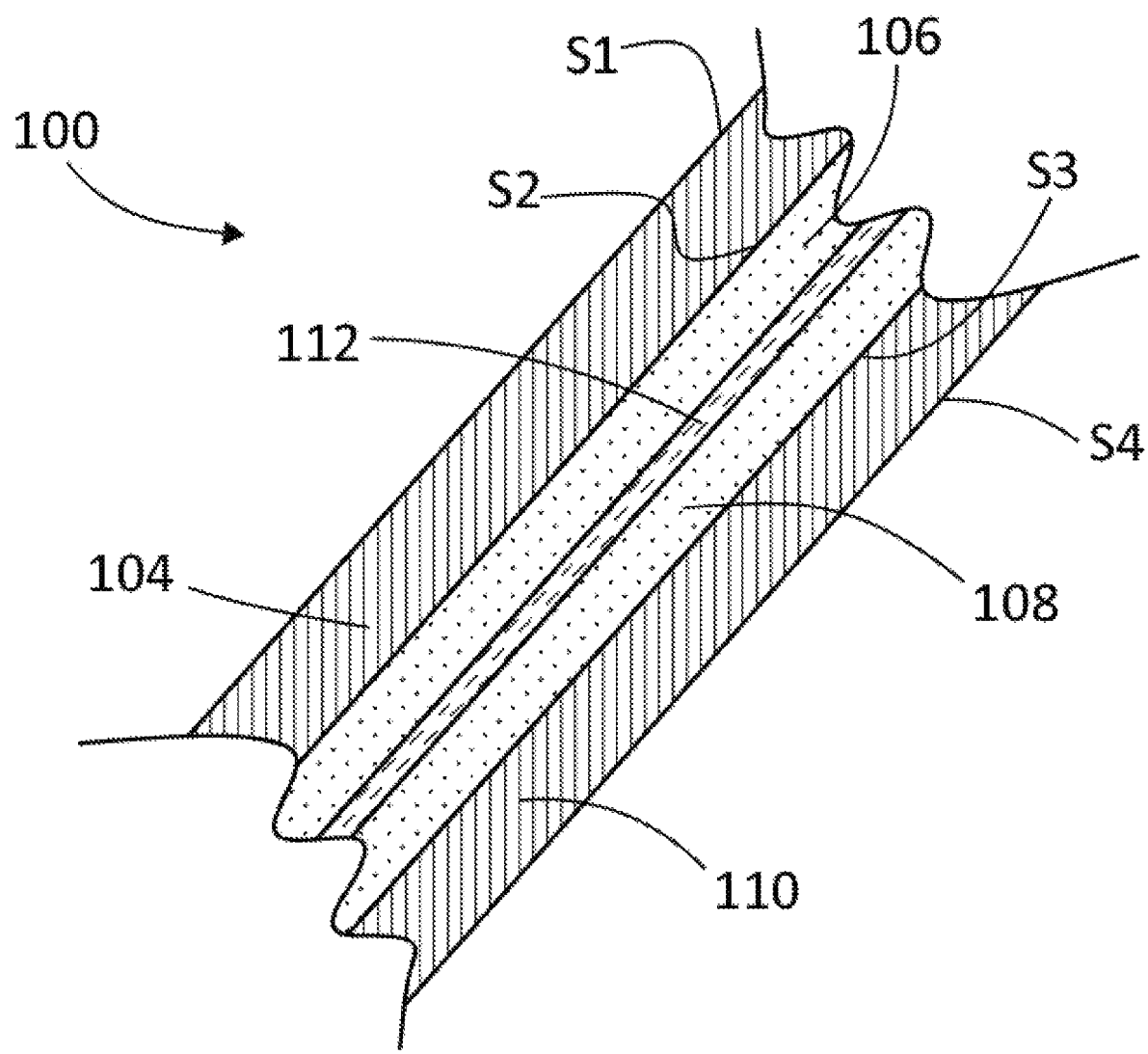
FIG. 1 illustrates a cross section view of a glazing having a luminescent film, according to an exemplary aspect of the present disclosure.

Disclosed herein are exemplary aspects of a glazing having a luminescent film. In the following description, for purposes of explanation, specific details are set forth in order to promote a thorough understanding of one or more aspects of the disclosure. It may be evident in some or all instances, however, that many aspects described below can be practiced without adopting the specific design details described below.

Embodiments disclosed herein may be used for automotive glazings, including, without limitation, windshields, back windows, side windows, sunroofs, and any other appropriate glass surface. As used herein, the term "S1" may refer to the exterior glass surface in an automotive application. The term "S4" may refer to the interior glass substrate surface of a laminated automotive glass product. "S2" may be a glass substrate surface opposite S1 and "S3" may be a glass substrate surface opposite S4. In a laminated glass product, S2 and S3 may be a part of the laminate interior, facing one another.

According to some aspects of the present disclosure, a luminescent film may be laminated in a glazing. The luminescent film may include a luminescent coating on a carrier film, where the carrier film may include any suitable material, such as polyethylene terephthalate (PET), polycarbonate (PC), polyurethane (PU), polystyrene (PS), cellulose triacetate (TAC), or others. The luminescent capability may be provided by a fluorescent or phosphorescent material, which may include particles and/or dyes. In some embodiments, the luminescent film may be dyed or include embedded materials or particles which provide a luminescent capability which can be activated with activating light having a certain light wavelength range. The luminescent capability may provide for a single color or multiple colors in a display. For example, if the luminescent film contains only materials that emit a red color, the luminescent film may emit only a red color when activated. Alternatively, if the luminescent film contains materials for three different colors, such as, red, green, and blue, three different colors or mixed colors of these three colors can be emitted from the luminescent film.

A conventional laminated glazing may include a first glass sheet and a second glass sheet laminated together with an adhesive interlayer therebetween. The adhesive interlayer may particularly include a polymer adhesive, such as polyvinyl butyral (PVB) or ethylene vinyl acetate (EVA), or an ionomer material. The glass sheets may be initially flat and may be bent, typically at temperatures of at least 560° C., and more preferably at least about 580° C. Lamination of the glass sheets and interlayer may include autoclaving the materials with heat and pressure (for example, 110° C. to 160° C. and 1.0 to 1.5 MPa) for 15 to 60 minutes. Such a process may be used to prepare various vehicle glazings, including windshields, back windows, sunroofs, and side windows. The shape and amount of bend in the glass sheets may depend on the application and the window design.

Head-up displays (HUDs) may be used with some glazings, such as windshields, to provide a transparent display which may present data without requiring a vehicle driver to look away from a usual field of view. The transparent display may provide an actual or virtual image displayed on or near a glazing. In some HUD systems, a projector may be located in a dashboard to project an image which, when reflected on a windshield, may appear as a virtual image on top of the hood of the vehicle. The HUD system may be located in the dashboard on a driver's side of the vehicle, such that the image is visible to the driver during operation of the vehicle. The HUD system may include an image light source with a display and may include one or more curved mirrors placed to project an image onto the windshield. The projection may be reflected off of the windshield enabling the driver to see an image floating in space above the steering wheel, which may be at a perceived distance of about 1.5 to 20 meters in front of the driver. The HUD system may display important information to the driver, including vehicle speed, warning signals from the engine management system, fuel gauge and tire pressure readings, navigation system information, and may highlight impending road obstacles or lane edges when the vehicle travels around sharp curves in the road.

Where visible light is projected onto a glazing, more than one reflection is possible which may provide a hazy or unclear image where the reflections are not aligned with each other. For example, light emitted from a projector may be reflected to a driver from an inner glazing surface (surface S4) and from an exterior glazing surface (surface S1). Some glazings include a wedge-shaped interlayer in an effort to reduce or eliminate the difference in reflection location. The second image may then combine with the first image to create a single image for the observer. However, a wedge-shaped interlayer may only combine the images for people of a certain height where their eyes properly align with the combined images. The placement of an observer's eyes may change the image location. A wedge-shaped interlayer may only combine the images in a small range of heights, and taller or shorter drivers or passengers having a height different from a driver may not benefit from the wedge shape. The wedge-shaped interlayer may also lead to high production costs and require precise surface control. Therefore, there is a need in the art for larger a glazing which may provide HUD images, a wider range of clear image observers, and visibility for both a driver and passengers.

Among other features, in accordance with aspects of the present disclosure, a luminescent film is provided which may be excited by a particular, non-visible, light wavelength to provide an image on a laminated glazing. Particularly, a luminescent film may provide a real image by diffuse light when an activating light is projected thereon. The real image may be visible from a vehicle interior, exterior, or both. In some embodiments, the image may present a method to an observer outside of the vehicle, such as a warning or other information for a pedestrian. Pedestrians may look towards a vehicle window to receive signals or other information from a vehicle which may be provided by an illuminated luminescent film in the window.

As disclosed herein, a luminescent film may be laminated between glass substrates to provide a luminescent glazing. The luminescent film may particularly include luminescent materials which are excited by a particular activating light wavelength, or wavelength range, such that the luminescent film may appear transparent unless excited by the activating light wavelength. The luminescent material may be any suitable form, including particles or dyes, organic or inorganic. The luminescent material may, in some embodiments, be soluble in plastics, inks, or other coating or carrier bases. In some embodiments, the luminescent materials may be a part of a coating which may be applied to a film. For example, luminescent particles or dyes may be dissolved in a coating base to provide a luminescent coating. In further embodiments, the luminescent material may be a mixed, dissolved, or embedded in a film. In some embodiments, the luminescent material may be equally distributed in a coating or film, including a film layer.

The amount of luminescent material used may affect the intensity of light produced from excitation of the luminescent film. A greater concentration of luminescent materials may provide a more intense luminescent response to light excitation. Quantum efficiency of the luminescent material may also affect the intensity of excited light. The luminescent material may be any suitable material, including nitrides such as $(SrCa)AlSiN_3$: $Eu^{2+}$, oxides such as $Y_3Al_5O_{12}$: $Ce^{3+}$ and $Lu_3Al_5O_{12}$: $Ce^{3+}$, II-VI semiconductor compounds such as zinc sulfide, cadmium sulfide, zinc selenide, cadmium selenide, zinc telluride and cadmium telluride, and organic compounds such as dialkyl-dihydroxy-terephthalate. Where luminescent materials are provided as particles, the particles may preferably be less than 20 µm in diameter, more preferably less than 12 µm, and even more preferably less than 6 µm. Small particle size may be preferable to reduce haziness in the film where there is no activating light wavelength applied. The luminescent material may be excitable, such that when treated by an activating light wavelength, for example, the luminescent material is illuminated. The luminescent material may preferably be excitable by light wavelength in a range of 250-475 nm. It may be preferable that the luminescent material illuminates when treated with a wavelength less than or equal to 400 nm, more preferably equal to or less than 380 nm. In some embodiments, the luminescent material may be broadband excitable such that the material may illuminate for a range of light wavelengths. Preferably, the luminescent film is transparent, such that without an exciting source, there is total visible light transmission of preferably at least 70% through the luminescent film and a glazing having such a luminescent film laminated therein. The total visible light transmission of the glazing having a luminescent film may be less than 70% in some embodiments, including side windows, back windows, and sunroofs. The total light transmittance may be determined according to ISO 9050: 2003, "Glass in building—Determination of light transmittance, solar direct transmittance, total solar energy transmittance, ultraviolet transmittance and related glazing factors". To measure light transmission across a wavelength spectrum or at a particular wavelength, including the visible light wavelength range, any suitable equipment complying with the ISO 9050:2003 may be used, such as a UV-Vis Spectrophotometer (e.g., U4000, Hitachi High-Tech Science). Further, a glazing having a luminescent film may preferably have a haze of less than 5%, more preferably less than 2%, and even more preferably less than 1%. Haze may be measured by DIN ISO 3537 using illuminant A and any standard haze meter.

As shown in FIG. 1, a laminated glazing 100 may include a luminescent film 112, therein. A laminated glazing 100 may include an exterior first glass sheet 104 having opposing surfaces S1 and S2 and an interior second glass sheet 110 having surfaces S3 and S4. The luminescent film 112 may be laminated therein between a first interlayer 106 and a second interlayer 108. A projector for exciting and illuminating the luminescent film 112 may preferably be directed to the luminescent film 112 from a vehicle interior. Where the projector is directed to the luminescent film 112 from the vehicle interior, the activating light must pass through the second glass sheet 110 and the second interlayer 108 before reaching the luminescent film 112. It is thus desirable for the second glass sheet 110 and the second interlayer 108 to be transparent to an activating light wavelength which may be projected on the luminescent film 112. The desired transparency in the second glass sheet 110 and the second interlayer 108 at the activating light wavelength may depend on the light emitted from a projector for use with the laminated glazing 100. For example, where the transparency of the second interlayer 108 is 80% at the activating light wavelength, a projected light having lower intensity may be used as compared to a laminated glazing 100 having a second interlayer 108 with a transparency of 60% at the activating light wavelength. It may be preferable that the activating light wavelength is non-visible light, which may include ultraviolet light wavelengths, such that the projected activating light may not provide a visible reflection from a surface of the laminated glazing 100.

Typically, an interlayer may contain ultraviolet (UV) light absorbing additives which block UV light from a vehicle interior and protect the interlayer material from UV exposure. For example, without the UV absorbing additives, an interlayer may be altered by extended UV exposure, including changes in color. In particular embodiments, a first interlayer 106 may include UV absorbing additives and a second interlayer 108 may not include UV absorbing additives effective in the activating light wavelength such that a vehicle interior may be protected from UV exposure by the first interlayer 106, the luminescent film, may not be illuminated by an exterior UV light source, such as the sun, through the first interlayer 106, and an activating light in the UV range may be projected onto a laminated film to provide an illuminated image through the second interlayer 108. Further, where the first interlayer 106 absorbs light in the activating light wavelength, the activating light may not reach the luminescent film after reflection from surface S1. If the activating light were reflected from surface S1, it may create a second area of illumination in the luminescent film, which may be undesirable as it may cause an unclear or hazy illumination. In some embodiments, the second interlayer may prevent transmission of UV light outside of the activating light wavelength. Preferably, the first interlayer 106 may have a transparency in the activating light wavelength of 1.0% or less.

Figure 2:
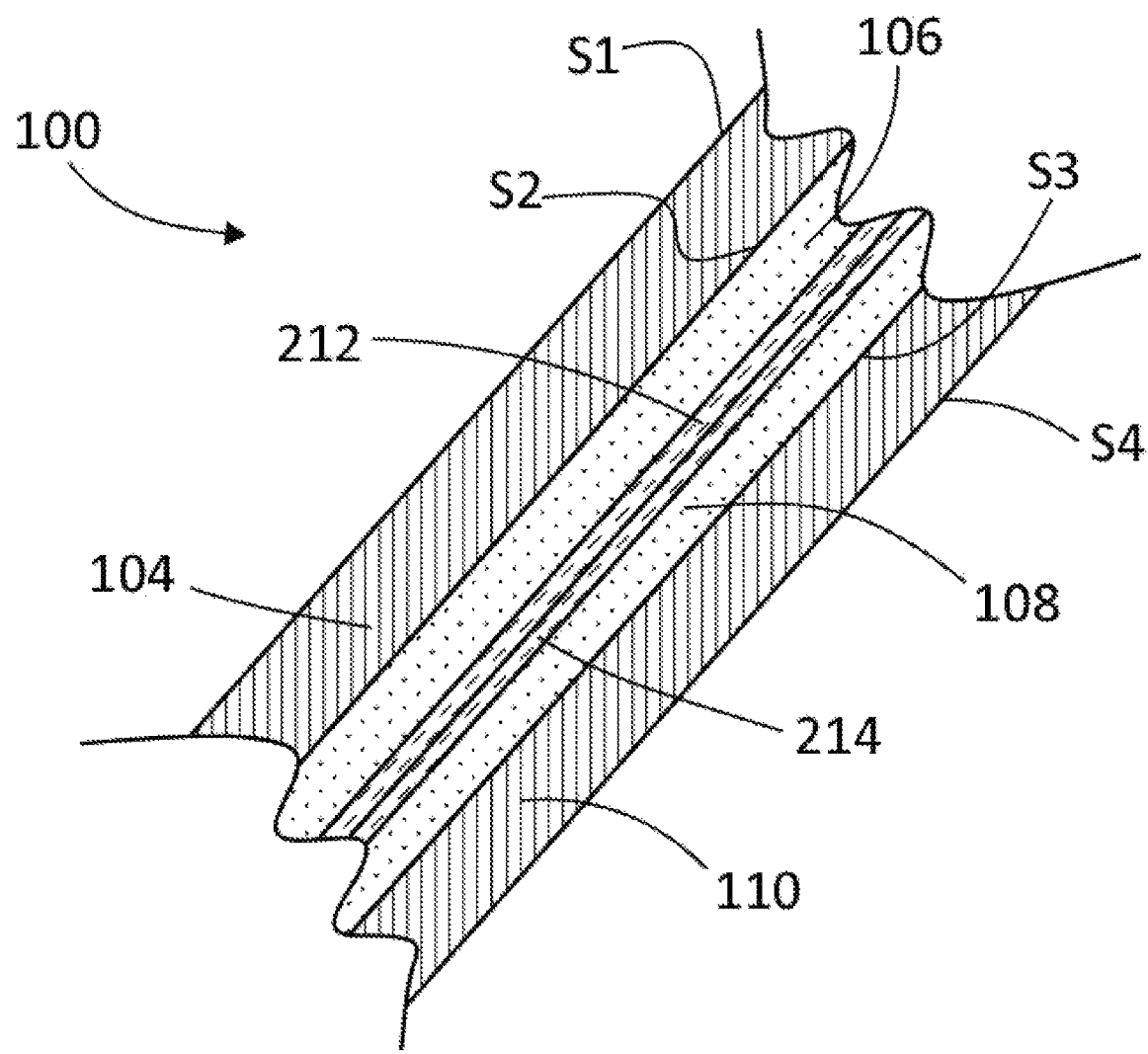
FIG. 2 illustrates a cross section view of a glazing having a luminescent film, according to an exemplary aspect of the present disclosure.

As shown in FIG. 2, the luminescent film may include a carrier film 212 having a luminescent coating 214 in some embodiments. The carrier film 212 may be a base film on which a luminescent coating is formed. The carrier film 212 may typically be formed of a film such as, polyethylene terephthalate (PET), polycarbonate (PC), polyurethane (PU), polystyrene (PS), cellulose triacetate (TAC), or any other suitable film. The luminescent coating 214 may contain luminescent material such as that describe above. In FIG. 2, the carrier film 212 faces the first interlayer 106, but, alternatively, the carrier film 212 may be provided as to face the second interlayer 108.

Figure 3:
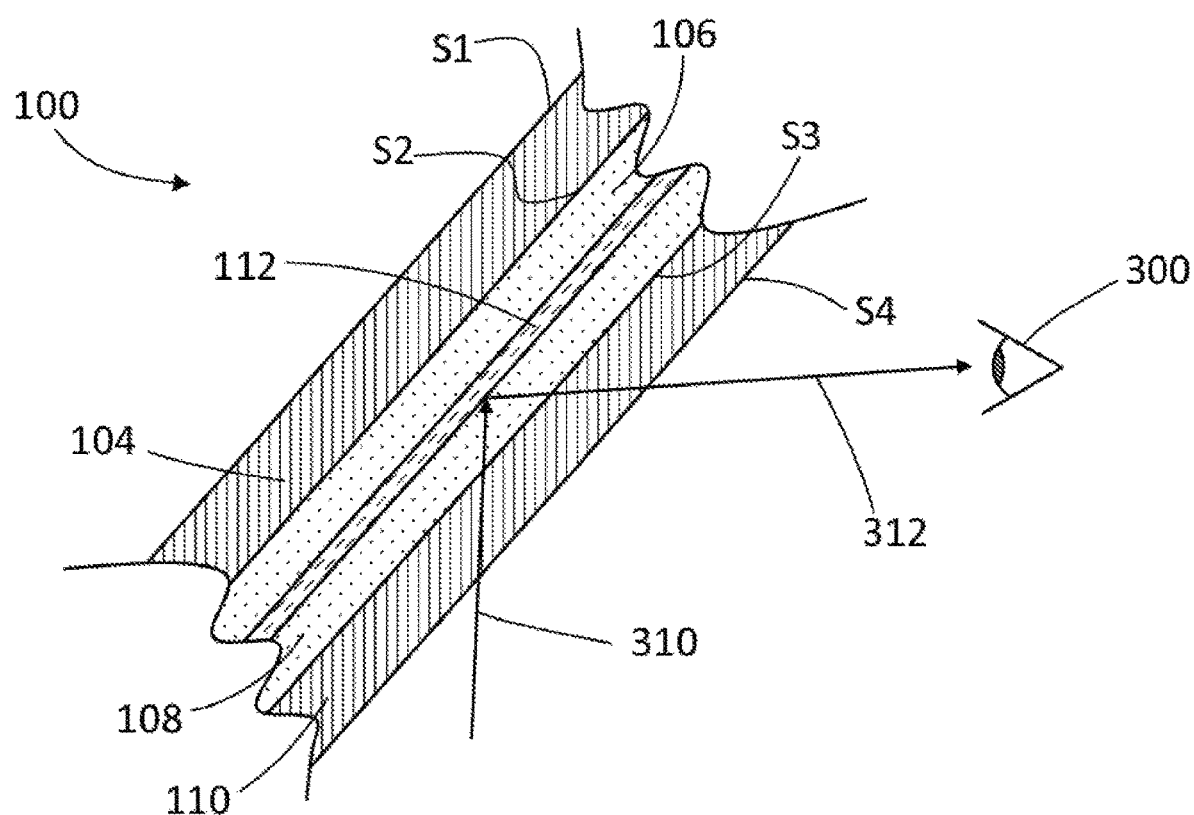
FIG. 3 illustrates a cross section view of a glazing having a luminescent film, according to an exemplary aspect of the present disclosure.

According to embodiments disclosed herein, a luminescent glazing may be used with a projector to provide a HUD system or other projected displays, as shown in FIG. 3. A projector may preferably direct light 310 in an activating light wavelength or wavelengths to excite the luminescent film 112. Luminescent material in the luminescent film 112 may be excited and illuminate when light 310 is projected onto the glazing 100 to provide an illuminated (real) image transmitted 312 for a driver or passenger's eye 300. The projected image may relate directly to the image created at the film 112 such that the projection resolution may be the same or substantially the same as the image resolution. Preferably, the light 310 projected onto the glazing has a light wavelength less than or equal to 400 nm, more preferably less than or equal to 380 nm. It may be preferable in some embodiments that the light projected 310 is not visible prior to reaching the luminescent film 112 as described herein. It may be preferable in some embodiments that the projector emit more than one light wavelength. In further embodiments, more than one projector may be used to project an image, and the projectors may have the same or different light wavelengths emitted therefrom. In certain embodiments, the image formed is a real image on the glazing, such that the image seen by an observer, including a driver or a pedestrian, appears at the glazing.

Luminescent films 112 may be used for non-HUD projections as well. The luminescent film 112 may, for example, be used on an automotive glazing to provide information to a vehicle passenger or an observer from outside the vehicle. The luminescent film 112 may thus be laminated in any suitable glazing, such as a windshield, a side window, back window, partition, or sunroof.

However, plasticizers in the interlayers may migrate from the interlayers to the luminescent film, and the migrated plasticizers may affect luminescent materials such that the luminescent film is not effective when activation light is radiated. A luminescent film may be provided in a laminated glazing having barrier layers between the luminescent material in the film and the interlayers to prevent such plasticizer migration.

Plasticizers may include phthalic acid esters such as dioctyl phthalate (DOP), diisodecyl phthalate (DIDP), ditridecyl phthalate and butylbenzyl phthalate (BBP), phosphoric acid esters such as tricresyl phosphate (TCP) and trioctyl phosphate (TOP), fatty acid esters such as tributyl citrate and methylacetyl ricinolate (AR), polyether esters such as triethyleneglycol-di-2-ethylbutylate (3GH) and tetraethyleneglycoldihexanol, and mixtures of these compounds.

Figure 4:
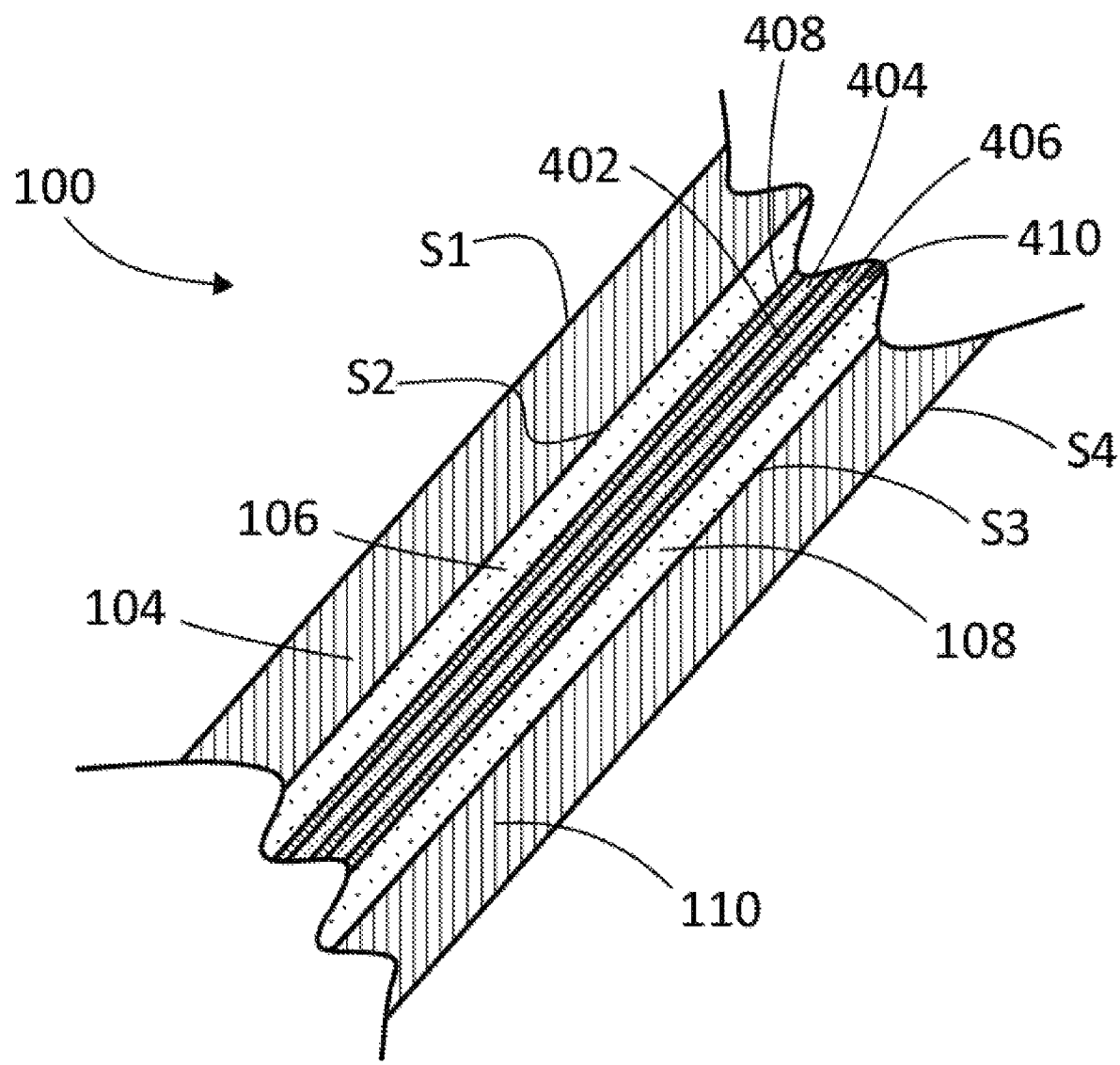
FIG. 4 illustrates a cross section view of a glazing having a luminescent film with barrier layers, according to an exemplary aspect of the present disclosure.

FIG. 4 shows an exemplary laminated glazing 100 having a luminescent film including barrier layers 404, 406. The luminescent film may be formed with five layers, e.g., a first base film 408, a first barrier layer 404, a luminescent core layer 402, a second barrier layer 406, and a second base film 410. The luminescent core layer 402 may include luminescent materials in any suitable form, including particles or dyes, organic or inorganic, etc. as describe above, including a luminescent coating or film. In some embodiments, the luminescent core layer 402 may include red organic luminescent compounds. The luminescent core layer 402 may be excited with different wavelength lights such that multiple colors are emitted by the luminescent film. In some particular examples, the luminescent core layer 402 may include red organic luminescent compounds, green organic luminescent compounds, and blue organic luminescent compounds. For emitting red, green, and blue lights, three exciting lights having different wavelengths may be projected from a projector (not shown) installed inside the vehicle.

The luminescent core layer 402 may be sandwiched by a pair of base films 408, 410 serving as carrier films. The base films 408, 410 may be formed of any suitable material, such as polyethylene terephthalate (PET), polycarbonate (PC), polyurethane (PU), polystyrene (PS), cellulose triacetate (TAC), or others. The first and second barrier layers 404, 406 may prevent plasticizers contained in the interlayers 106, 108 from migrating to the luminescent material layer 402 during the autoclaving step. In some embodiments, the first and second barrier layers 404, 406 may be formed on the base film 408, 410 and then laminated together with the luminescent core layer 402. The first and second barrier layers 404, 406 may be made of any suitable material which may prevent the migration of plasticizers, such as a metal, metal oxide, metal oxynitride or metal nitride. Metals may include, for example, silver, gold, copper, nickel, or titanium. Metal oxides may include, for example, indium tin oxide (ITO), indium oxide, zinc oxide, titanium oxide, silicon oxide, or aluminum oxide. Metal nitrides may include, for example, titanium nitride, silicon nitride, aluminum nitride, or aluminum silicon nitride. Metal oxynitrides may include, for example, titanium oxynitride, silicon oxynitride, aluminum oxynitride, or aluminum silicon oxynitride. A barrier layer may be formed with a thickness of 1 nm to 10 micrometers, or preferably 10 nm to 1 micrometers. A barrier layer may be formed by any suitable method, such as physical vapor deposition (PVD), chemical vapor deposition (CVD), solution coating or slurry coating. In some embodiments, the barrier layers 404, 406 may include one or more layers. The barrier layers 404, 406 may include, for example, a base coating layer which may help with adhesion to a base film 408, 410 or a top coating which may protect the barrier layer 404, 406 during handling.

The luminescent film may be laminated in a glazing, which may include an autoclave process which is generally conducted as a heat and pressure treatment (for example, 110° C. to 160° C. and 1.0 to 1.5 MPa) for 15 to 60 minutes. In certain embodiments, the luminescent core layer 402 may contain organic luminescent compounds. Where no barrier layer is provided, the autoclave process may promote migration of plasticizers contained in the interlayers, and the luminescent core layer 402 containing organic luminescent compounds may lose its luminescent capability due to migration of the plasticizers. Because the barrier layers 404, 406 may prevent plasticizers from migrating, the luminescent core layer 402 may retain functionality after an autoclave process.

The structure of the luminescent film with barrier layers may not be limited to the structure shown in FIG. 4. For example, the luminescent film may be formed with a first barrier layer, a base film, a luminescent core layer, a base film, and a second barrier layer. Another example of the luminescent film may be formed with a carrier film, a first barrier layer, a luminescent core layer, and a second barrier layer. Another example of the luminescent film may be formed with a first barrier layer, a luminescent core layer, and a second barrier layer.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A laminated automotive glazing, comprising:
   a first glass sheet;
   a first interlayer;
   a luminescent film having luminescent capability;
   a second interlayer; and
   a second glass sheet,
   wherein each of the first interlayer and the second interlayer are disposed between the first glass sheet and the second glass sheet,
   wherein the luminescent film is disposed between the first interlayer and the second interlayer,
   wherein the luminescent film comprises a luminescent core layer positioned between first and second barrier layers, the first and second barrier layers preventing migration of plasticizers contained in the first and second interlayers to the luminescent core layer,
   wherein the luminescent film is reactive to an activating light wavelength, and
   wherein the second interlayer is transparent to the activating light wavelength and the first interlayer has a transparency at the activating light wavelength of equal to or less than 1.0%.

2. The laminated automotive glazing according to claim 1, wherein the second glass sheet faces a vehicle interior.

3. The laminated automotive glazing according to claim 1, wherein the luminescent film comprises a carrier film having a luminescent coating thereon.

4. The laminated automotive glazing according to claim 1, wherein the luminescent film includes luminescent particles embedded in the luminescent film.

5. The laminated automotive glazing according to claim 1, wherein the luminescent film comprises a dyed film.

6. The laminated automotive glazing according to claim 1, wherein the automotive glazing is a windshield.

7. The laminated automotive glazing according to claim 1, wherein the luminescent core layer includes organic luminescent compounds.

8. The laminated automotive glazing according to claim 7, wherein the organic luminescent particles include red organic luminescent compounds.

9. The laminated automotive glazing according to claim 7, wherein the luminescent core layer comprises red organic luminescent compounds, green organic luminescent compounds, and blue organic luminescent compounds.

10. The laminated automotive glazing according to claim 1, wherein the luminescent film further comprises a first carrier film.

11. The laminated automotive glazing according to claim 10, wherein the luminescent film further comprises a second carrier film.

12. The laminated automotive glazing according to claim 1, wherein the barrier layer is made of metal, metal oxide, metal oxynitride, or metal nitride.

13. The laminated automotive glazing according to claim 12, wherein the metal oxide is selected from a group of indium tin oxide, indium oxide, zinc oxide, titanium oxide, silicon oxide, and aluminum oxide.

14. The laminated automotive glazing according to claim 1, wherein the first interlayer and the second interlayer are made of polyvinyl butyral.

15. The laminated automotive glazing according to claim 1, wherein the luminescent film further comprises a carrier film that is made of polyethylene terephthalate.

16. The laminated automotive glazing according to claim 15, wherein the barrier film is made of indium tin oxide, and wherein the first interlayer and the second interlayer comprise polyvinyl butyral.

17. The laminated automotive glazing according to claim 1, wherein a total visible light transparency of the laminated automotive glazing is at least 70%.

18. The laminated automotive glazing according to claim 1, wherein the laminated automotive glazing has a haze of less than 5%.

* * * * *